US006917518B2

United States Patent
Chen

(10) Patent No.: US 6,917,518 B2
(45) Date of Patent: Jul. 12, 2005

(54) COMPUTER ENCLOSURE HAVING ENGAGING DEVICE

(75) Inventor: Li Ping Chen, Tu-Chen (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 10/318,625

(22) Filed: Dec. 13, 2002

(65) Prior Publication Data

US 2004/0080901 A1 Apr. 29, 2004

(30) Foreign Application Priority Data

Oct. 25, 2002 (TW) ....................................... 91217051 U

(51) Int. Cl.⁷ .............................................. G06F 1/16
(52) U.S. Cl. ...................... 361/683; 361/685; 361/724
(58) Field of Search ................................ 361/683, 685, 361/724–727

(56) References Cited

U.S. PATENT DOCUMENTS

| | | | | |
|---|---|---|---|---|
| 5,208,735 A | * | 5/1993 | Twachtmann et al. ...... | 361/725 |
| 5,751,545 A | * | 5/1998 | Jung .......................... | 361/683 |
| 5,793,614 A | * | 8/1998 | Tollbom ..................... | 361/732 |
| 6,442,021 B1 | * | 8/2002 | Bolognia et al. ........... | 361/685 |
| 6,490,153 B1 | * | 12/2002 | Casebolt et al. ............ | 361/685 |

* cited by examiner

Primary Examiner—Yean-Hsi Chang
(74) Attorney, Agent, or Firm—Wei Te Chung

(57) ABSTRACT

A computer enclosure includes: a bottom casing (20); a top casing (10) defining an opening (12) and detachably attached to the bottom casing; and an engaging device (40) including an upper unit (50) mounted below the opening of the top casing, and a lower unit (60) mounted to the bottom casing. The upper unit includes a bracket (51), and first and second levers (54, 56) pivotably mounted in the bracket. The first lever has first and second ends (542, 544). The lower unit of the engaging device includes parallel driving plates (64) defining generally U-shaped cutouts (640). When the first end of the first lever is rotated downwardly or upwardly, the second end of the first lever slidingly drives against the driving plates at rear or front extremities respectively of the U-shaped cutouts, thereby respectively attaching or detaching the top casing to or from the bottom casing.

13 Claims, 5 Drawing Sheets

COMPUTER ENCLOSURE HAVING ENGAGING DEVICE

BACKGROUND OF THE INVENTION

1. Field of the Invention

The present invention relates to computer enclosures, and more particularly to a computer enclosure capable of being easily assembled and disassembled.

2. Related Art

A computer generally comprises an enclosure for housing various computer components such as a motherboard, a hard disk drive and so on. One purpose of the enclosure is to protect the components housed therein from physical damage. Another purpose is to prevent electromagnetic signals generated by components of the computer from escaping and causing EMI (electromagnetic interference) to other electronic devices in the vicinity of the computer. A further purpose is to prevent electromagnetic signals generated by other electronic devices in the vicinity of the computer from entering the computer and causing EMI to components of the computer.

The enclosure typically comprises a plurality of panels connected to each other with screws or similar fasteners. This inevitably slows down assembly of the enclosure, and increases costs in mass production facilities. In addition, the screws or other fasteners add to the inventory in a mass production facility. The more inventory items that need to be monitored, the higher the risk of production line shutdown in the event of a shortage of inventory.

Some computer enclosures adopt hooks to reduce or even eliminate the need for screws. Hooks formed on panels of the enclosure engage in recesses defined in other panels of the enclosure. Engaging force between the hooks and the other panels at the recesses is generally large enough to ensure stability of the enclosure. However, panels of some large computers such as servers are quite thick, to prevent electromagnetic interference. These panels are correspondingly heavy, and the engaging force of the hooks can be correspondingly powerful. This makes it difficult to manipulate the panels by hand.

Therefore, an engaging device for a computer enclosure which overcomes the above-mentioned problems is desired.

SUMMARY OF THE INVENTION

Accordingly, an object of the present invention is to provide an engaging device for a computer enclosure that enables easy assembly and disassembly of the computer enclosure.

To achieve the above-mentioned object, a computer enclosure in accordance with a preferred embodiment of the present invention comprises a bottom casing, a top casing detachably attached to the bottom casing, and an engaging device. The engaging device comprises an upper unit attached to an underside of the top casing, and a lower unit attached to an upper face of the bottom casing. The upper unit comprises a bracket having a first lever and a second lever pivotably mounted thereto. The first lever has a first end and a second end. The lower unit comprises a pair of parallel driving plates defining generally U-shaped cutouts therein. When the first lever is rotated downwardly, the second end thereof slidingly drives against the driving plates of the lower unit at rear extremities of the U-shaped cutouts. This causes the top casing to move forwardly and engage with the bottom casing. When the first lever is rotated upwardly, the second end slidingly drives against the driving plates at front extremities of the U-shaped cutouts. This causes the top casing to move rearwardly and disengage from the bottom casing.

Other objects, advantages and novel features of the present invention will be drawn from the following detailed description of a preferred embodiment of the present invention with attached drawings, in which:

DESCRIPTION OF THE PREFERRED EMBODIMENT

Figure 1:
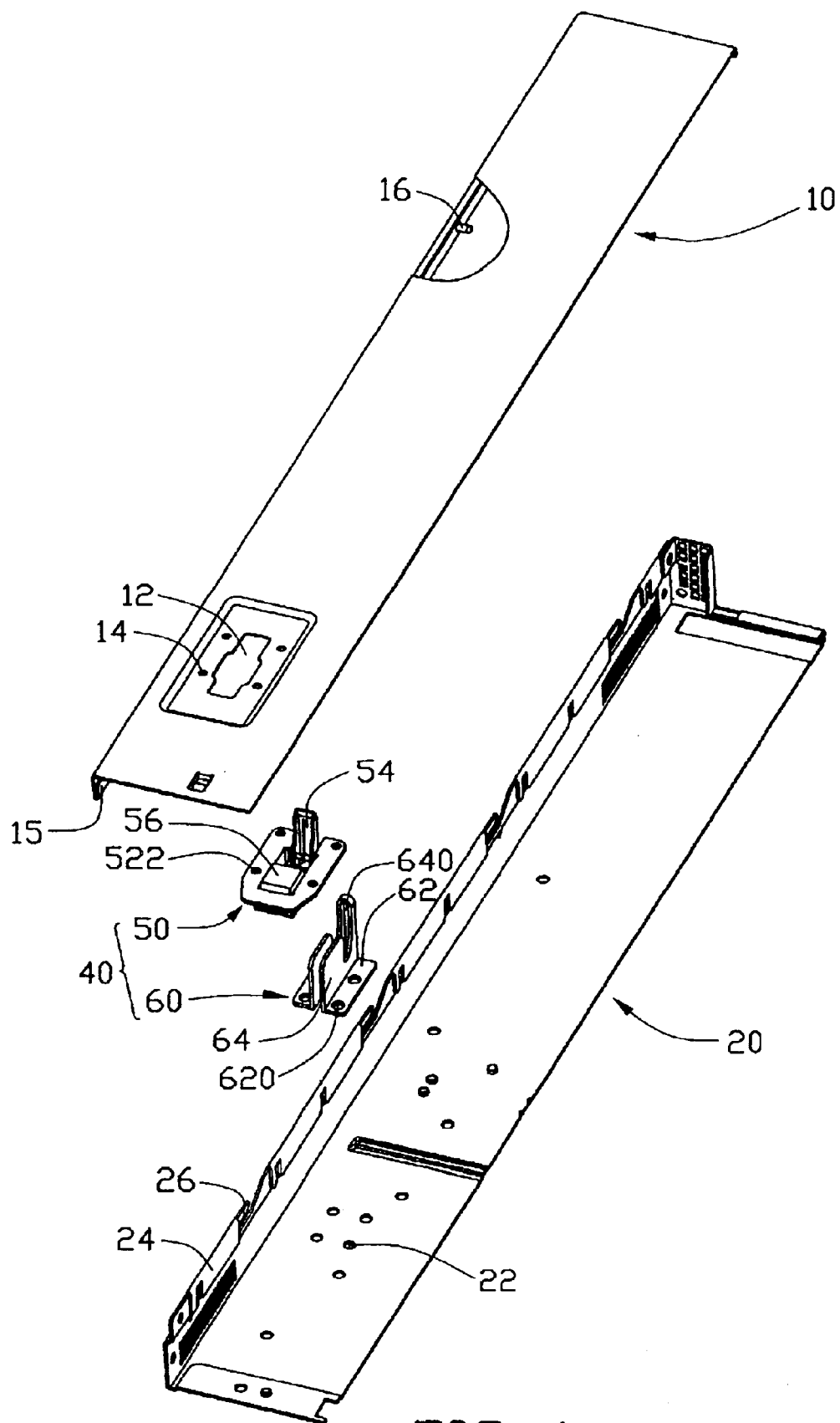
FIG. 1 is an exploded, isometric view of a computer enclosure with an engaging device in accordance with a preferred embodiment of the present invention.

Referring to FIG. 1, a computer enclosure in accordance with a preferred embodiment of the present invention comprises a top casing 10, a bottom casing 20 and an engaging device 40 mounted respectively thereto. By means of operating the engaging device 40, the computer enclosure can be readily assembled or disassembled.

The top casing 10 comprises a side panel 15 depending from a longitudinal edge thereof. The bottom casing 20 comprises a side panel 24 extending upwardly from a longitudinal edge thereof, corresponding to the side panel 15. When the top and bottom casings 10, 20 are attached to each other, they cooperatively define a space therebetween for receiving computer components such as a motherboard, a hard disk drive and so on. A plurality of aligned and evenly spaced positioning pins 16 extends inwardly from the side panel 15 of the top casing 10. A plurality of guide slots 26 is defined in the side panel 24 of the bottom casing 20, for engagingly receiving the positioning pins 16 respectively. An opening 12 is defined in a front portion of a top panel of the top casing 10. Four positioning holes 14 are defined in the top panel, around a periphery of the opening 12. Four mounting holes 22 are defined in a front portion of a bottom panel of the bottom casing 20.

The engaging device 40 comprises an upper unit 50 fixed to the top casing 10, and a lower unit 60 fixed to the bottom casing 20.

Figure 2:
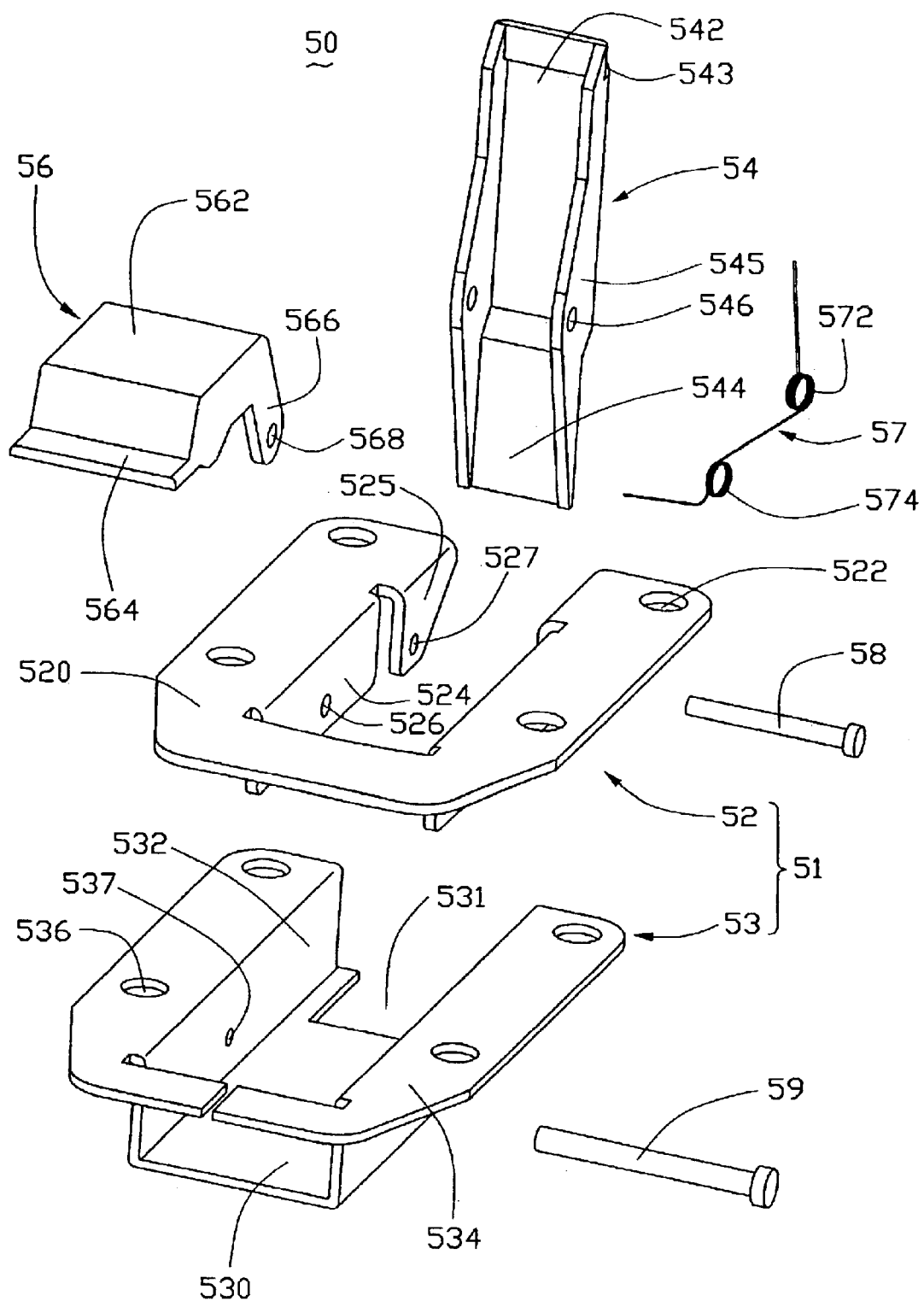
FIG. 2 is an enlarged, exploded isometric view of a bracket of the engaging device of FIG. 1.
Figure 3:
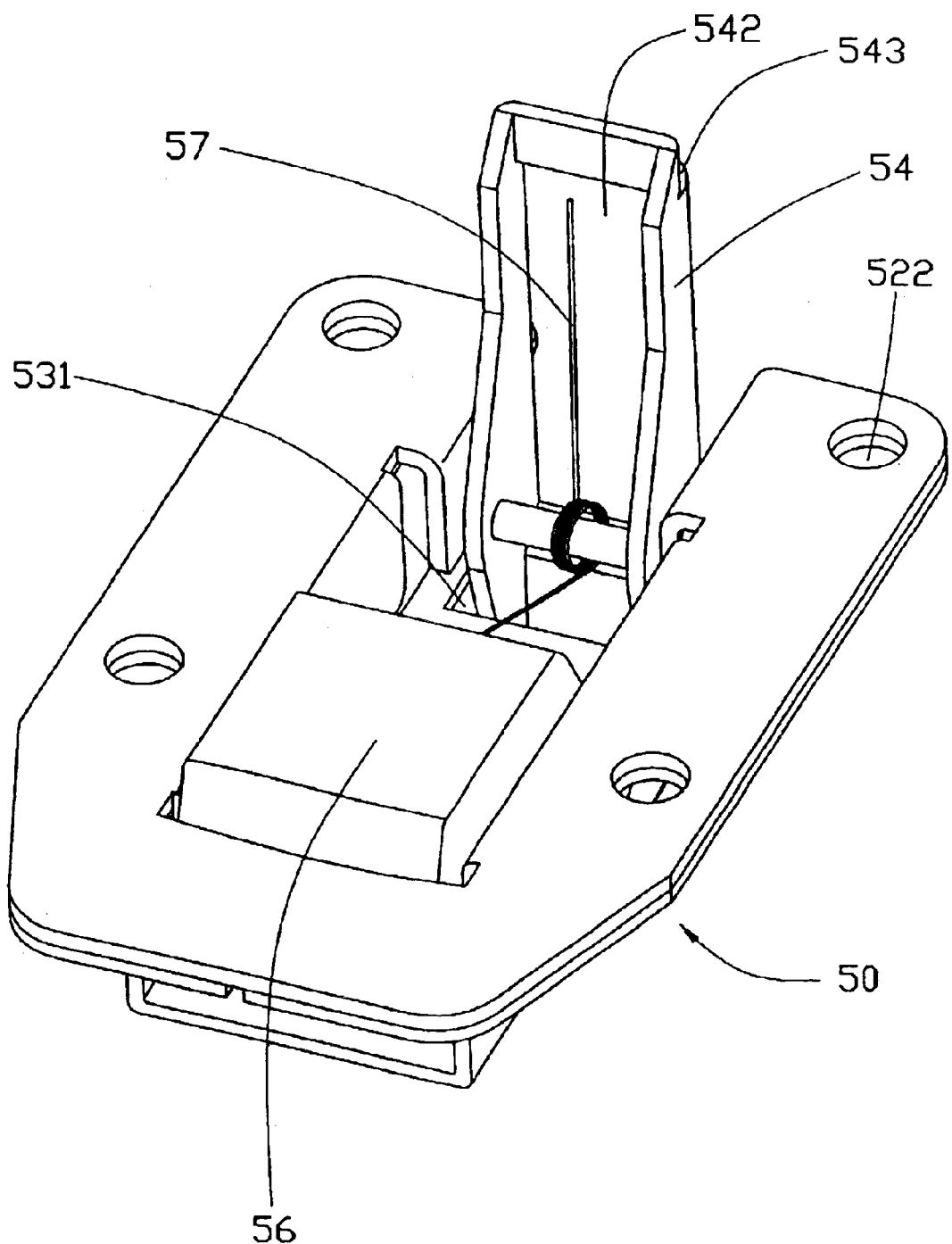
FIG. 3 is an assembled view of FIG. 2, showing the engaging device in a released state.
Figure 4:
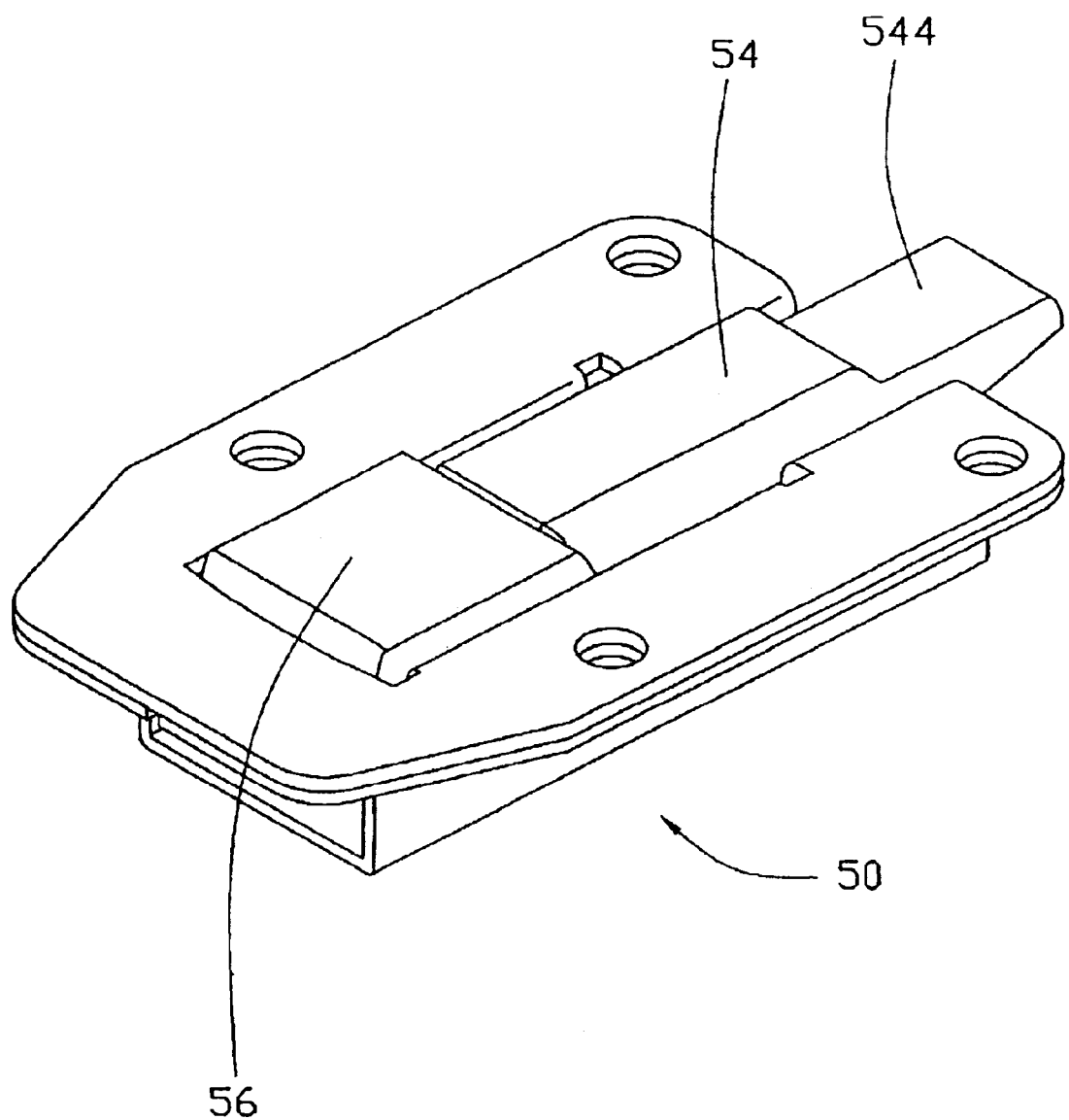
FIG. 4 is an assembled view of FIG. 2, showing the engaging device in a locked state, and viewed from a slightly different aspect.

Referring also to FIGS. 2 to 4, the upper unit 50 comprises a bracket 51, and a first lever 54 and a second lever 56 received in the bracket 51. The bracket 51 has a generally two-layer structure, comprising an upper frame 52 and a lower frame 53. The upper frame 52 comprises a top plate 520. Four positioning holes 522 are defined in four corners of the top plate 520 respectively. A middle of the top plate 520 is stamped downwardly to form two pairs of spaced parallel tabs 524, 525. The tabs 524 oppose each other, and the tabs 525 oppose each other. The tabs 524 are located forwardly of the tabs 525. The tabs 524 are spaced apart a distance slightly greater than a distance by which the tabs 525 are spaced apart. A pair of through holes 526 is defined in the tabs 524 respectively, and a pair of through holes 527 is defined in the tabs 525 respectively. The lower frame 53 comprises a bottom plate 530, and a pair of side plates 532 extending upwardly from opposite sides of the bottom plate 530 respectively. The side plates 532 are spaced apart a distance slightly greater than the distance by which the tabs 524 of the upper frame 52 are spaced apart, to enable the side plates 532 to fittingly receive the tabs 524 therebetween. The bottom plate 530 defines a gap 531 at a rear end thereof, corresponding to the tabs 527 of the upper frame 52. A pair of though holes 537 is defined in the side plates 532 respectively, corresponding to the through holes 526 of the tabs 524 of the upper frame 52. Top portions of the side plates 532 are bent respectively outwardly to form a pair of flanges 534. The flanges 534 are coplanar with each other, and parallel to the top plate 520 of the upper frame 52. Two spaced positioning holes 536 are defined in each flange 534, the positioning holes 536 corresponding to the positioning holes 522 of the top plate 520.

The first lever 54 comprises a first end 542 and a second end 544. A step 543 is formed at the first end 542. A pair of parallel ribs 545 extends from opposite longitudinal edges of the first lever 54 respectively. A width of each rib 545 is highest at a middle portion thereof, the width gradually decreasing from the middle portion to each of the first and second ends 542, 544 respectively. The ribs 545 at the first end 542 are beveled, to enable the first end 542 to slidingly ride over the second lever 56 in operation. The ribs 545 at the first end 542 also strengthen the step 543 thereat. A pair of pivot holes 546 is defined in the middle portions of the ribs 545 respectively, corresponding to the through holes 527 of the upper frame 52. The second lever 56 comprises a flat pressing portion 562, and a catch 564 formed at a front of the pressing portion 562. The catch 564 is for engaging with the top plate 520 of the upper frame 52 of the bracket 51. A pair of projections 566 extends downwardly and slightly outwardly from opposite sides of a rear of the pressing portion 562 respectively. A pair of pivot holes 568 is defined in free ends of the projections 566 respectively, corresponding to the through holes 526, 537 of the bracket 51. The first and second levers 54, 56 each have a predetermined length, so that when the first and second levers 54, 56 are mounted to the bracket 51 and both disposed horizontally, the step 543 of the first lever 54 and the rear of the pressing portion 562 of the second lever 56 partially overlap.

The upper unit 50 further comprises a spring 57 having two coils 572, 574. The coils 572, 574 are for engaging with the first and second levers 54, 56 and with two bolts 58, 59, thereby movably attaching the first and second levers 54, 56 to the bracket 51.

In assembly of the upper unit 50, the first lever 54 is placed between the tabs 525 of the upper frame 52, and the spring 57 is placed between the ribs 545 of the first lever 54. The through holes 527 of the tabs 525, the pivot holes 546 of the ribs 545 and the coil 572 of the spring 57 are aligned with one another. The bolt 58 is extended through the through holes 527, the pivot holes 546 and the coil 572. Thus the first lever 54 is pivotably mounted to the upper frame 52, with one end of the spring 57 being engaged with the first end 542 of the first lever 54.

Then the combined upper frame 52 and first lever 54 is placed on the lower frame 53. The top plate 520 and the flanges 534 abut each other, the positioning holes 522, 536 respectively of the top plate 520 and the flanges 534 are aligned with each other, and the tabs 524 are fittingly received between the side plates 532. One of the tabs 525 and one of the side plates 532 cooperatively define a space therebetween receiving a head of the bolt 58. The first end 542 of the first lever 54 is resiliently engaged with an end of the spring 57, so that the second end 544 of the first lever 54 is disposed at the gap 531 of the bottom plate 530. The second lever 56 is placed between the side plates 532, with the catch 564 being disposed below a front portion of the top plate 520. The spring 57 is disposed between the projections 566 of the second lever 56. The through holes 537 of the side plates 532, the pivot holes 568 of the projections 566 and the coil 574 of the spring 57 are aligned with each other. The bolt 59 is extended through the through holes 537, the pivot holes 568 and the coil 574. The upper frame 52 is accordingly mounted to the lower frame 53, with the second lever 56 pivotably mounted to the bracket 51. An opposite end of the spring 57 is engaged with the pressing portion 562 of the second lever 56. Thus, the upper unit 50 of the present invention is fully assembled.

Referring to FIG. 3, the first lever 54 is in a substantially vertical position. In this position, the first lever 54 is defined to be in a released state. The first end 542 of the first lever 54 is resiliently pushed by one end of the spring 57, and the second end 544 of the first lever 54 is disposed at the gap 531. The catch 564 of the second lever 56 is resiliently pushed upwardly by an opposite end of the spring 57. Therefore, the catch 564 pressingly abuts a bottom of the front portion of the top plate 520 of the upper frame 52.

Referring to FIG. 4, the first end 542 of the first lever 54 is rotated downwardly by an operator, thereby compressing the coil 572 of the spring 57. When the first end 542 reaches the rear of the pressing portion 562 of the second lever 56, it presses the rear of the pressing portion 562 downwardly. The second lever 56 is rotated downwardly, thereby compressing the coil 574 of the spring 57, and simultaneously the first end 542 presses the rear of the pressing portion 562 downwardly and forwardly. Thus the first end 542 rides over the rear of the pressing portion 562. Once the first end 542 has completely ridden over the rear of the pressing portion 562, the second lever 56 is rotated upwardly back to its original position by decompression of the coil 574 of the spring 57. The operator releases the first end 542, and the first end 542 is rotated slightly upwardly by decompression of the coil 572 of the spring 57. Thus the step 543 of the first lever 54 is snappingly engaged against and blocked by the rear of the pressing portion 562 of the second lever 56. The first lever 54 is in a substantially horizontal position. In this position, the first lever 54 is defined to be in a locked state. The step 543 of the first lever 54 pressingly abuts the rear of the pressing portion 562 of the second lever 56, and the catch 564 of the second lever 56 pressingly abuts the front portion of the top plate 520. When it is desired to release the first lever 54, the pressing portion 562 of the second lever 56 is pressed downwardly by the operator to release the step 543 of the first lever 54, whereupon the first lever 54 is rotated upwardly to the substantially vertical position by decompression of the coil 572 of the spring 57.

Referring to FIG. 1, the lower unit 60 comprises a bifurcated mounting plate 62, and two parallel driving plates 64 extending upwardly from a middle of the mounting plate 62. Four mounting holes 620 are defined in the mounting plate 62, corresponding to the mounting holes 22 of the bottom casing 20. A pair of generally U-shaped cutouts 640 is defined in the driving plates 64 respectively, for cooperatively movably receiving the second end 544 of the first lever 54. The first lever 54 can then function with the driving plates 64, as described in detail below. The preferred embodiment of the present invention provides two driving plates 64 having cutouts 640. However, any similar structure may be adopted such that the second end 544 of the first lever 54 is movably receivable in an appropriate space in the structure, whereby the first lever 54 can cooperatively function with the structure in like manner as is described in detail below.

Figure 5:
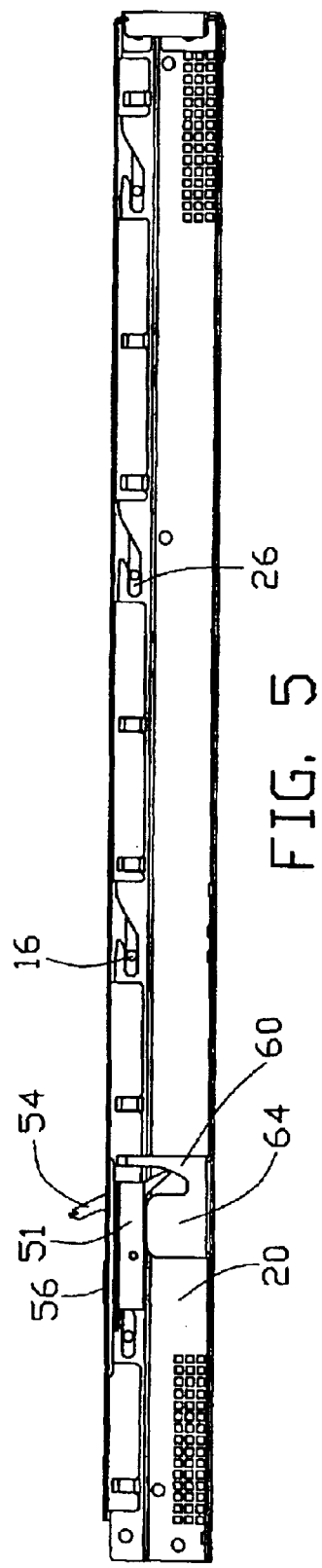
FIG. 5 is a side elevation view of the computer enclosure of FIG. 1 in the process of being fully assembled.
Figure 6:
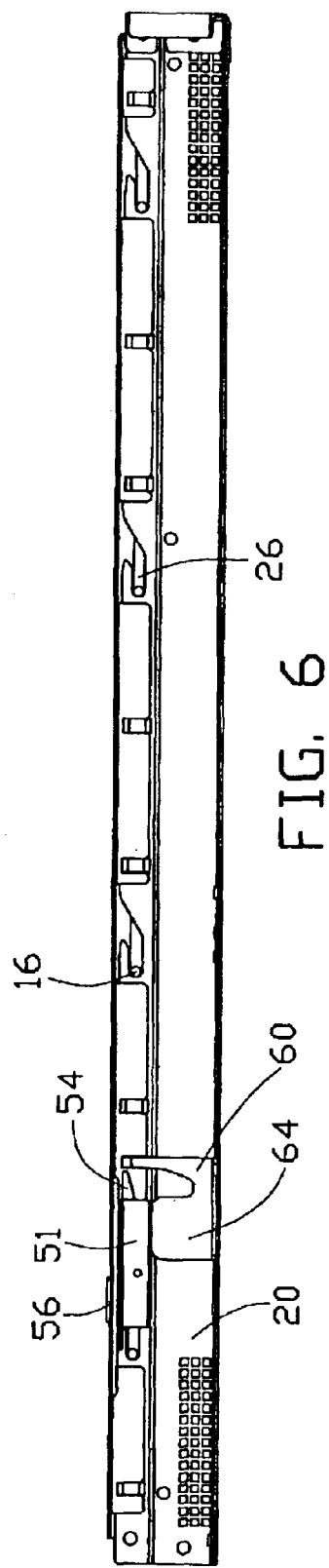
FIG. 6 is similar to FIG. 5, but showing the computer enclosure fully assembled.

Referring to FIGS. 5 and 6, in pre-assembly, the positioning holes 522, 536 of the upper unit 50 are aligned under the positioning holes 14 of the top casing 10. Simultaneously, the first lever 54 of the upper unit 50 is received through the opening 12 of the top casing 10. Four fasteners such as screws are extended through the positioning holes 14, 522, 536 to thereby fasten the upper unit 50 to an underside of the top casing 10. The mounting holes 620 of the lower unit 60 are aligned over the mounting holes 22 of the bottom casing 20. Four fasteners such as screws are extended through the mounting holes 22, 620 to thereby fasten the lower unit 60 to an upper face of the bottom casing 20.

In assembly, the top casing 10 is placed on the bottom casing 20. The side panel 15 of the top casing 10 is slid forwardly and slightly downwardly, so that the pins 16 of the side panel 15 are guided into entrance portions of the guide slots 26 of the side panel 24 of the bottom casing 20 respectively. In this position, the first lever 54 is in a released state (see FIG. 5). Then the first lever 54 is rotated downwardly until the first end 542 thereof snappingly engages under the rear of the pressing portion 562 of the second lever 56. Simultaneously, the second end 544 of the first lever 54 slidingly drives against the driving plates 64 of the lower unit 60 at rear extremities of the cutouts 640. That is, the second end 544 moves from bottom portions of the cutouts 640 to top portions of the cutouts 640. As a result, the top casing 10 is driven forwardly a short distance, with the pins 16 sliding to inmost portions of the guide slots 26 respectively. Thus the top casing 10 is securely attached to the bottom casing 20, and the computer enclosure is fully assembled (see FIG. 6).

Figure 7:
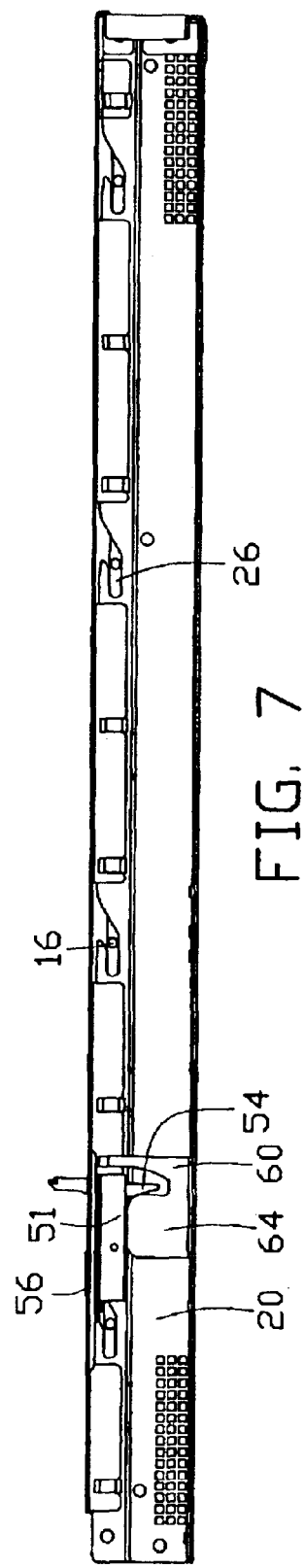
FIG. 7 is similar to FIG. 5, but showing the computer enclosure partially disassembled.

Referring also to FIG. 7, in disassembly, the pressing portion 562 of the second lever 56 is pressed downwardly, so that the first end 542 of the first lever 51 is released from the rear of the pressing portion 562 of the second lever 56. The first lever 51 rotates upwardly by decompression of the coil 572 of the spring 57, and the ribs 545 at the second end 544 of the first lever 54 pressingly abut against the driving plates 64 of the lower unit 60 at front extremities of the cutouts 640. Then, the first end 542 of the first lever 54 is rotated further upwardly by the operator, so that the ribs 545 at the second end 544 slidingly drive against the driving plates 64. That is, the second end 544 moves from upper portions of the cutouts 640 to bottom portions of the cutouts 640. As a result, the top casing 10 is driven rearwardly a short distance, with the pins 16 of the top casing 10 sliding to the entrance portions of the guide slots 26 respectively. The top casing 10 is then easily removed from the bottom casing 20.

In the computer enclosure of the present invention, attachment and detachment of the top casing 10 to and from the bottom casing 20 are achieved by simple operation of the first and second levers 54, 56. This saves time, and reduces costs in mass production facilities.

It is understood that the invention may be embodied in other forms without departing from the spirit thereof. Thus, the present examples and embodiments are to be considered in all respects as illustrative and not restrictive, and the invention is not to be limited to the details given herein.

What is claimed is:

1. A computer enclosure comprising:
   a bottom casing;
   a top casing detachably connected to said bottom casing and defining an opening; and
   an engaging device comprising:
      an upper unit attached below said opening, said upper unit comprising a bracket, and a first lever pivotably mounted to said bracket, said first lever having a first end extending through said opening in a first position and a second end; and
      a lower unit attached to said bottom casing, said lower unit comprising a first driving portion and a second driving portion;
   wherein when said first lever is located in the first position and is rotated downwardly to a second position, said second end drives against said first driving portion of said lower unit to cause said upper unit to be moved in a first direction, thereby attaching said top casing to said bottom casing, and wherein said first lever is generally fully received in said bracket when said first lever is located in said second positions;
   wherein when said first lever is rotated upwardly away from the second position to the first position, said second end drives against said second driving portion of said lower unit to cause said upper unit to be moved in a second direction that is opposite to the first direction, thereby detaching said top casing from said bottom casing;
   wherein said engaging device further comprises a second lever pivotably mounted to said bracket;
   wherein said second lever comprises a pressing portion, and a catch formed at a front of said pressing portion, and said first end of said first lever comprises a step for engaging with said pressing portion.

2. The computer enclosure as described in claim 1, wherein said step of said first lever engages with a rear of said pressing portion in the second position, and when said pressing portion is pressed downwardly, said first lever is released from the rear of said pressing portion.

3. The computer enclosure as described in claim 2, wherein said engaging device further comprises a spring having two coils, with one end of the spring engaged with said first end of said first lever, and an opposite end of the spring engaged with said pressing portion of said second lever.

4. The computer enclosure as described in claim 3, wherein said upper unit comprises fastening means for retaining said first and second levers and said spring to said bracket, said first and second levers being pivotable about said fastening means respectively.

5. The computer enclosure as described in claim 4, wherein said bracket comprises upper and lower frames joined by said fastening means, and said upper and lower frames comprise overlapping plates mounted to said top casing at a periphery of said opening.

6. The computer enclosure as described in claim 5, wherein the plate of said upper frame comprises two pairs of parallel tabs depending from a middle portion thereof, said lower frame comprises opposite parallel side plates with a bottom plate connecting therebetween, and the tabs of said upper frame are received between the side plates of said lower frame.

7. The computer enclosure as described in claim 6, wherein said bottom plate of said lower frame defines a gap for receiving said second end of said first lever.

8. The computer enclosure as described in claim 1, wherein said top casing comprises a side panel depending from a longitudinal edge thereof, a plurality of positioning pins extends inwardly from the side panel of the top casing, said bottom casing comprises a side panel extending upwardly from a longitudinal edge thereof, and a plurality of guide slots is defined in the side panel of the bottom casing for receiving the positioning pins respectively.

9. An engaging device for detachably attaching a first member to a second member, said engaging device comprising:

an upper unit adapted for being attached to the first member, said upper unit comprising a first lever and a second lever respectively pivotably mounted thereto, said first lever being free from said second lever in a first position, and being releasably engaged with said second lever in a second position, said first lever having a first end and a second end; and a lower unit adapted for being attached to the second member, said lower unit comprising a first driving portion and a second driving portion;

wherein when said first end of said first lever is rotated from the first position to the second position, said second end of said first lever drives against said first driving portion of said lower unit to cause said upper unit to be moved in a first direction, thereby attaching the first member to the second member;

wherein said upper unit comprises an elastic member having two resilient portions, with one end of the elastic member engaged with said first lever, and an opposite end of the elastic member engaged with said second lever.

10. The engaging device as described in claim 9, wherein when in the second position said second lever is pressed downwardly, said first end of said first lever is released from said second lever and rotated toward the first position by one of the resilient portions of the spring member, and when said first end is further rotated manually, said second end drives against said second driving portion of said lower unit to cause said upper unit to be moved in a second direction that is opposite to said first direction, thereby detaching the first member from the second member.

11. The engaging device as described in claim 9, wherein said first end of said first lever comprises a detent mechanism for releasably engaging with said second lever.

12. The engaging device as described in claim 11, wherein said detent mechanism comprises a step formed at said first end of said first lever.

13. The engaging device as described in claim 9, wherein said first driving portion and said second driving portion cooperatively define a generally U-shaped cutout therebetween in said lower unit.

* * * * *